May 30, 1961      B. J. CHROMY      2,986,064
DEVICE FOR OPTICAL EXAMINATION OF GEM MATERIALS
Filed March 3, 1960
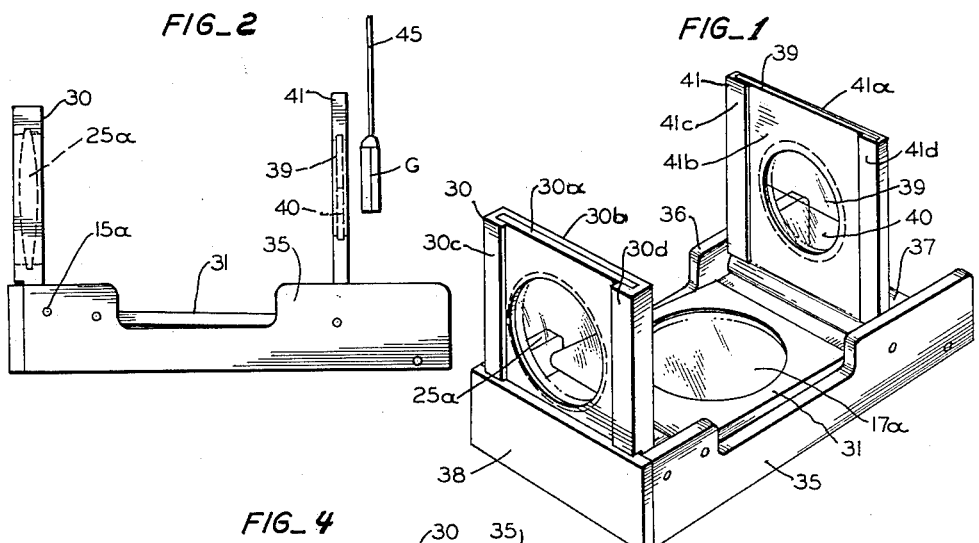
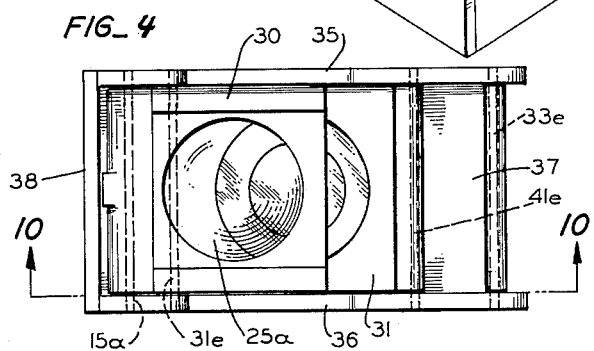
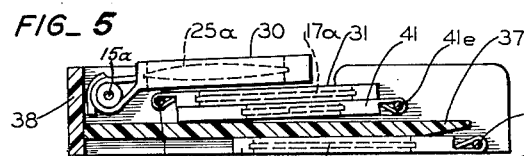
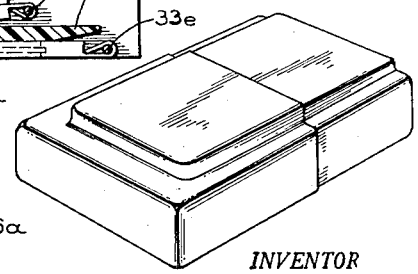
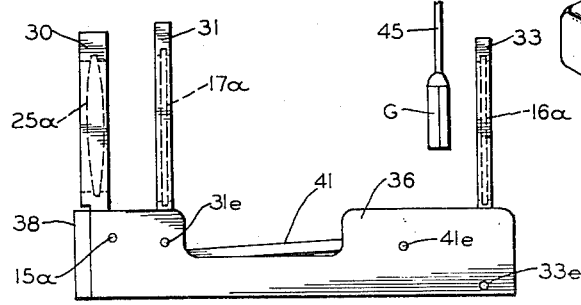
INVENTOR
Ben. J. Chromy

United States Patent Office 2,986,064
Patented May 30, 1961

2,986,064
DEVICE FOR OPTICAL EXAMINATION OF GEM MATERIALS
Benjamin J. Chromy, 14590 Horseshoe Drive, Saratoga, Calif.
Filed Mar. 3, 1960, Ser. No. 12,527
4 Claims. (Cl. 88—14)

This invention relates to a device for examining transparent or translucent minerals, gems and gem materials.

An object of this invention is to provide an improved device for the optical examination of transparent or translucent crystalline minerals or gem materials to determine the crystalline or amorphous nature thereof.

Another object of this invention is to provide an improved device of a foldable nature that may be employed either as a polariscope or as a dichroscope.

Still another object of this invention is to provide an improved optical device that may be constructed efficiently and inexpensively for student use in the study of transparent or translucent gem materials to determine some of the optical properties thereof.

Other objects of this invention will be apparent to those skilled in the art to which it relates from the following specifications and claims.

In accordance with this invention there is provided a compact and inexpensive device that is very useful for examining transparent or translucent gem materials and finished gems to determine whether they are singly or doubly refractive. Also, in the case of transparent or translucent colored doubly refractive gem materials or finished gems, this device may be employed for observing the pleochroic colors thereof. This device is therefore useful for the purpose of separating amorphous gem materials, such as glass and those crystallizing in the isometric system, from those crystallizing in the other five crystal systems.

Briefly, this device comprises a foldable viewing device which is adapted to be used either as a polariscope or as a dichroscope. The polariscope feature of this device is provided with a pair of crossed light polarizing elements made in sheet form and sold under the trademark "Polaroid" by the Polaroid Corporation of Cambridge, Mass., and these elements are spaced apart so that the material to be examined may be held therebetween. The dichroscope feature of this device is also provided with a pair of similar light polarizing elements which are also crossed and held side by side in an aperture plate which is adapted to be swung into the line of sight in the viewing device when the polariscope light polarizing elements are folded out of the line of sight in the device.

Referring to the drawing briefly,

Fig. 1 is a perspective view of an embodiment of this invention adapted for use as a dichroscope;

Fig. 2 is a side view of the embodiment of this invention shown in Fig. 1, arranged for use as a dichroscope;

Fig. 3 is a side view of the device shown in Fig. 1, arranged for use as a polariscope;

Fig. 4 is a plan view of the device in folded condition;

Fig. 5 is a view taken along the line 10—10 of Fig. 4;

Fig. 6 is a perspective view of a case for this device.

Referring to Figures 1–6 there is shown an embodiment of this invention in which the lens 25a and the polariscope elements 16a and 17a, as well as the dichroscope elements 39 and 40 are clamped in panel members which are pivotally supported between a pair of substantially parallel side frame members 35 and 36. These frame members are attached to the back member 37 along the substantially parallel sides thereof. A front member 38 is attached to the ends of the side members 35 and 36 and also to the end of the back member 37 to brace the frame comprising these members.

Each of the elements 25a, 16a, 17a, 39 and 40 is supported in an apertured frame member which is pivotally supported on a small rod extending between the parallel members 35 and 36. Thus the lens 25a, which may be made of plastic such as acrylic resin or glass, is clamped in the apertured frame member 30 between the front 30a and the back 30b. The lens is positioned in the apertures of this frame and edge portions of the lens are clamped by marginal areas of the front and back surrounding the apertures when the side flap portions 30c and 30d, formed integral with the back 30b, are bent over the edge portions of the front 30a. When these front and back portions 30a and 30b are shaped, they are bent around the pivoting pin 15a and frictionally grip this pin as shown in the sectional view Fig. 5.

Likewise, the dichroscope element which comprises the light polarizing elements 39 and 40 that are arranged to pass polarized light which is polarized at right angles, are supported in the apertured frame 41. These elements are arranged so that the plane of polarization of the light transmitted by the semi-circular light polarizing element 39 is at right angles to the plane of polarization of the light transmitted by the semi-circular light polarizing element 40. These elements are held against each other so that they form a circular element, as shown in Fig. 1, by the apertured frame member 41 which comprises the front section 41b and the rear section 41a which are formed integral and folded against each other around the pivot pin 41e. This pivot pin 41e is frictionally gripped in the bend formed when the sections 41a and 41b are bent into shape to clamp the light polarizing elements 39 and 40 therebetween. After the apertured frame member 41 is bent into shape so that the apertures in the front and back sections thereof are in alignment and the light polarizing elements 39 and 40 are positioned in this aperture and clamped by peripheral portions thereof, the side flap portions 41c and 41d are bent over the section 41b to hold this section clamped against the light polarizing elements which are in turn clamped against the other section 41a.

The polariscope elements which are held in the apertured frame members 31 and 33 are held in these frame members in the same manner as the light polarizing elements 39 and 40 are held in frame member 41. These frame members 31 and 33 frictionally clamp pivot pins 31e and 33e, respectively, between the respective front and back sections thereof in the same manner as frame member 41 frictionally clamps the pivot pin 41e. The end portions of the pins 31e and 33e are positioned in suitable holes formed in the side members 35 and 36 so that the members 31 and 33 are rotatable with respect to these side members after the friction on the pins 31e and 33e is overcome. This friction is useful because it holds the members in set positions either extended or folded against the back member 37.

The light polarizing element 16a functions as the light polarizer and this element is supported in the apertured frame member 33 in the aperture thereof, while the light polarizing element 17a which is supported in the apertured frame member 31 in the aperture thereof functions as the analyzer. The polarizer 16a which is positioned in the apertured frame member 33 is pivotally supported between the side frame members 35 and 36 by means of the pivot pin 33e that is frictionally engaged in the bend of the apertured frame member 33. This apertured frame member is pivotally supported on the side frame members 35 and 36 near the rear ends thereof so that this member 33 may be swung to the backside of the member 37, as shown in Fig. 5, when not in use. Thus when polarizer element 16a is erected into position for use, it is swung outwardly from behind the back 37 and around the end of this back so that it is erect as shown in Fig. 3. The lens 25a is swung on its pivot 15a so that it is erect as shown in Fig. 3 and the analyzer 17a is swung on its pivot 31e so that it is also erect as shown in this figure. The device is then aranged so that it may be employed as a polariscope, that is, the device may be held with the eyepiece 30 thereof up to the eye of the observer, and with the gem G supported on the dop stick 45 between the light polarizing elements 16a and 17a as shown in Fig. 3, observations may be made as to whether or not the gem is doubly refracting. When the device is to be used as a dichroscope the eyepiece 30 is erected as shown in Fig. 2 and the apertured frame member 41 supporting the light polarizing elements 39 and 40 is erected also as shown in this figure while the light polarizing elements 17a and 16a are folded against the back member 37 so that they are out of the way. With the device arranged as a dichroscope the gem G to be examined for dichroism is held on a suitable dop stick 45 or with a pair of tweezers on the far side of the light polarizing elements 39 and 40 as shown in Fig. 2. The device is then held with the lens 25a up to the eye of the observer and pointed toward a source of light so that light passes through the gem G into the elements 39 and 40. Thus the light coming from the source passes through the dichroic gem material G into the light polarizing elements 39 and 40 through which the dichroic colors of the gem material may be viewed by the observer looking through the lens 25a. Thus if the gem material is sufficiently dichroic, this property may be observed because the light polarizing sections 39 and 40 will selectively pass different color light rays determined by the dichroism of the gem material, to the lens 25a as the gem material is rotated in front of these light polarizing sections.

While the light polarizing elements of the polariscope and dichroscope shown in Figs. 1–6 are shown as clamped between the front and back of the apertured frame members 31, 33 and 41 which may be made of sheet metal, it is, of course, apparent that these elements may be positioned and held inside of or between suitable apertured panels of plastic material which may be either transparent or opaque. Thus these frame members 31, 33 and 41 may be plastic panels provided with apertures which have a suitable groove formed in the circumferences thereof into which round light polarizing elements may be pressed and cemented. These plastic panels are also pivoted to the frame by pins such as pin 31e.

This device when not in use may be folded with the elements thereof positioned between the parallel frame members 35 and 36 as shown in Figs. 4 and 5, and in this folded position the device may be carried in a suitable plastic case made of two telescoping parts, such as is provided for the carrying of cigarettes, as shown in Fig. 6.

Having described my invention in detail with respect to certain embodiments thereof, I do not desire to limit it to the exact details set forth except insofar as they are defined by the following claims.

What I claim is:

1. A foldable device for use in the examination of transparent or translucent gem materials by holding the device up to an eye of the observer and manipulating the gem material in the device during the examination thereof, the combination of a frame, an eyepiece including a lens, means for pivotally attaching said eyepiece to said frame near one end thereof, a first light polarizing element, means for pivotally attaching said light polarizing element to said frame adjacent to said eyepiece, a second light polarizing element, means for pivotally attaching said second light polarizing element near the other end of said frame with the light polarizing axis thereof disposed substantially at right angles to the light polarizing axis of said first polarizing element, said second light polarizing element being spaced from said first light polarizing element so that the gem material to be examined may be held and manipulated between said polarizing elements so that its double refraction may be observed through said lens, a pair of light polarizing elements positioned side by side and oriented so that the light passing through one of said pair of polarizing elements is polarized in a plane disposed at a right angle to the plane of polarization of the light passing through the other of said pair of polarizing elements, and means for pivotally supporting said pair of light polarizing elements on said frame between said first and said second light polarizing elements so that the gem material may be held and manipulated on the far side of said pair of polarizing elements so that its dichroism may be observed through said lens and said pair of polarizing elements when said first and said second light polarizing elements are folded against said frame.

2. A foldable device for use in the examination of transparent or translucent gem materials by holding the device up to an eye of the observer and manipulating the gem material in the device during the examination thereof, the combination of a frame having substantially parallel side members, an eyepiece including a lens, means extending between said side members for pivotally attaching said eyepiece to said frame near one end thereof, a first light polarizing element, means extending between said side members for pivotally attaching said light polarizing element to said frame adjacent to said eyepiece, a second light polarizing element, means extending between said side members for pivotally attaching said second light polarizing element near the other end of said frame with the light polarizing axis thereof disposed substantially at right angles to the light polarizing axis of said first polarizing element, said second light polarizing element being spaced from said first light polarizing element so that the gem material to be examined may be held and manipulated between said polarizing elements so that its double refraction may be observed through said lens, a pair of light polarizing elements positioned side by side and oriented so that the light passing through one of said pair of polarizing elements is polarized in a plane disposed at a right angle to the plane of polarization of the light passing through the other of said pair of polarizing elements, and means extending between said side members for pivotally supporting said pair of light polarizing elements on said frame between said first and said second light polarizing elements so that the gem material may be held and manipulated on the far side of said pair of polarizing elements so that its dichroism is observed through said lens and said pair of polarizing elements when said first and said second light polarizing elements are folded against said frame.

3. A foldable device for use in the examination of transparent or translucent gem materials by holding the device up to an eye of the observer and manipulating the gem material in the device during the examination thereof, the combination as set forth in claim 1 further characterized in that the means for pivotally attaching said eyepiece, said first light polarizing element, said second light polarizing element and said pair of light polarizing elements each comprise an apertured member with front and back portions and means for clamping said front and back portions together, said eyepiece, said first light polarizing element, said second light polarizing element and said pair of light polarizing elements in each case being clamped between said front and said back portions whereby they are supported on said frame.

4. A foldable device for use in the examination of transparent or translucent gem materials by holding the device up to an eye of the observer and manipulating the gem material in the device during the examination thereof, the combination as set forth in claim 1 further characterized in that the means for pivotally attaching said eyepiece, said first polarizing element, said second polarizing element, and said pair of polarizing elements each comprise a panel member made of plastic material.

References Cited in the file of this patent

UNITED STATES PATENTS

| | | |
|---|---|---|
| 1,744,485 | Michel et al. | Jan. 21, 1930 |
| 1,766,037 | Dawson | June 24, 1930 |
| 2,494,078 | Woodruff | Jan. 10, 1950 |
| 2,499,788 | Shore | Mar. 7, 1950 |